(12) United States Patent
Thompson et al.

(10) Patent No.: US 7,495,063 B2
(45) Date of Patent: Feb. 24, 2009

(54) REDUCED OLIGOMER CONCENTRATION IN HIGH PURITY POLYALKYLENE GLYCOLS

(75) Inventors: Robert Kirk Thompson, Lake Jackson, TX (US); Pierre Thomas Varineau, Lake Jackson, TX (US); Bruce Armin Barner, Sweeny, TX (US); David Alan Wilson, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 270 days.

(21) Appl. No.: 11/346,910

(22) Filed: Feb. 3, 2006

(65) Prior Publication Data

US 2007/0185307 A1 Aug. 9, 2007

(51) Int. Cl.
*C08G 64/00* (2006.01)
*C08F 6/00* (2006.01)

(52) U.S. Cl. ............... 528/196; 210/634; 210/639; 526/144; 528/198; 528/502 R; 570/122; 570/177

(58) Field of Classification Search ........... 528/196, 528/198, 425, 502 R; 210/634, 639; 526/144; 570/124, 177
See application file for complete search history.

(56) References Cited

U.S. PATENT DOCUMENTS

| | | | |
|---|---|---|---|
| 2,812,360 A | 11/1957 | Mills et al. | |
| 3,299,151 A | 1/1967 | Wismer et al. | |
| 3,495,010 A | 2/1970 | Fossel | |
| 3,833,669 A | 9/1974 | Gehm et al. | |
| 4,110,268 A | 8/1978 | Longley et al. | |
| 4,129,718 A | 12/1978 | Muzzio | |
| 4,137,398 A | 1/1979 | Muzzio | |
| 4,254,287 A | 3/1981 | Ziegenhain et al. | |
| 4,306,943 A | 12/1981 | Mori et al. | |
| 4,426,301 A | 1/1984 | Dexheimer et al. | |
| 4,430,490 A | 2/1984 | Doerge | |
| 4,443,634 A | 4/1984 | Ziegenhain et al. | |
| 4,482,750 A | 11/1984 | Hetzel et al. | |
| 4,507,475 A | 3/1985 | Straehle et al. | |
| 4,521,548 A | 6/1985 | Christen et al. | |
| 4,528,364 A | 7/1985 | Prier | |
| 4,650,909 A | 3/1987 | Yoakum | |
| 4,665,236 A | 5/1987 | Edwards | |
| 4,721,816 A | 1/1988 | Edwards | |
| 4,721,818 A | 1/1988 | Harper et al. | |
| 4,727,199 A | 2/1988 | King | |
| 4,751,331 A | 6/1988 | Efford | |
| 4,855,509 A | 8/1989 | Dave | |
| 4,877,906 A | 10/1989 | Harper | |
| 4,942,042 A | 7/1990 | Bhargava et al. | |
| 4,946,939 A * | 8/1990 | Murphy et al. ............ 528/421 |
| 4,946,984 A | 8/1990 | Hauser | |
| 4,960,952 A | 10/1990 | Kemp | |
| 4,967,017 A | 10/1990 | Schmid et al. | |
| 4,987,271 A | 1/1991 | Watabe et al. | |
| 5,012,013 A | 4/1991 | Wimmer et al. | |
| 5,023,224 A | 6/1991 | Kemp | |
| 5,026,923 A | 6/1991 | Kemp | |
| 5,057,627 A | 10/1991 | Edwards | |
| 5,074,842 A | 12/1991 | Clayton | |
| 5,077,048 A | 12/1991 | Kimura et al. | |
| 5,102,849 A | 4/1992 | Kemp et al. | |
| 5,104,987 A | 4/1992 | King | |
| 5,120,697 A | 6/1992 | King | |
| 5,124,144 A | 6/1992 | Giorgetti et al. | |
| 5,130,369 A * | 7/1992 | Hughes et al. .............. 524/846 |
| 5,268,510 A | 12/1993 | Schwab et al. | |
| 5,274,001 A | 12/1993 | Borody | |
| 5,344,996 A | 9/1994 | Nieh et al. | |
| 5,434,315 A | 7/1995 | Dorai et al. | |
| 5,443,826 A | 8/1995 | Borody | |
| 5,466,523 A | 11/1995 | Ogawa et al. | |
| 5,468,839 A | 11/1995 | Suppes et al. | |
| 5,468,840 A | 11/1995 | Tsutsui et al. | |
| 5,710,183 A | 1/1998 | Halow | |
| 5,767,324 A | 6/1998 | Chaffanjon et al. | |
| 5,811,566 A | 9/1998 | Watabe et al. | |
| 5,844,115 A | 12/1998 | Moody et al. | |
| 6,018,017 A | 1/2000 | Le-Khac | |
| 6,048,901 A | 4/2000 | Cleveland et al. | |
| 6,191,315 B1 | 2/2001 | Thankachan et al. | |
| 6,207,794 B1 | 3/2001 | Yamasaki et al. | |
| 6,245,947 B1 | 6/2001 | Guettes et al. | |
| 6,303,832 B1 | 10/2001 | Trotsch-Schaller et al. | |
| 6,306,263 B1 | 10/2001 | Gupta | |
| 6,372,927 B2 | 4/2002 | Tatsumi et al. | |
| 6,376,625 B1 | 4/2002 | Cosman et al. | |
| 6,376,721 B1 | 4/2002 | Priou et al. | |
| 6,410,676 B1 | 6/2002 | Yamasaki et al. | |
| 6,429,342 B1 | 8/2002 | Clement et al. | |

(Continued)

FOREIGN PATENT DOCUMENTS

CN 1044472 8/1990

(Continued)

*Primary Examiner*—Terressa M Boykin

(57) ABSTRACT

Polyalkylene glycol compositions having reduced low molecular weight oligomers are disclosed. Some compositions, particularly polyethylene glycol compositions, have a number average molecular weight range from about 3000 to about 10,000 g/mol and have a total oligomer concentration of less than about 400 ppm of all oligomers having a molecular weight of less than or equal to 812 g/mol and a total oligomer concentration of less than about 50 ppm of all oligomers having a molecular weight of less than or equal to 240 g/mol. Other polyalkylene compositions, particularly polyethylene glycol compositions, are characterized by a total oligomer concentration of less than about 90 ppm of all oligomers having a molecular weight less than or equal to 460 g/mol and are obtained without further processing to remove oligomers having a molecular weight of less than about 460 g/mol. Methods for making such compositions are also disclosed.

50 Claims, 2 Drawing Sheets

U.S. PATENT DOCUMENTS

| | | |
|---|---|---|
| 6,444,198 B1 | 9/2002 | Daggy et al. |
| 6,504,062 B2 | 1/2003 | Brons et al. |
| 6,620,976 B2 | 9/2003 | Sakanoue et al. |
| 6,642,422 B2 | 11/2003 | Itoh et al. |
| 6,645,481 B1 | 11/2003 | Cleveland et al. |
| 6,955,812 B2 | 10/2005 | Hirayama et al. |
| 2001/0051659 A1 | 12/2001 | Corpet et al. |
| 2002/0161267 A1 | 10/2002 | Itoh et al. |
| 2003/0202957 A1 | 10/2003 | Cleveland |
| 2004/0073069 A1 | 4/2004 | Heider et al. |
| 2005/0009695 A1 | 1/2005 | Klumpe et al. |

FOREIGN PATENT DOCUMENTS

| | | |
|---|---|---|
| DE | 1545020 | 3/1970 |
| DE | 210460 | 6/1984 |
| DE | 3807712 | 2/1989 |
| EP | 0400554 | 12/1990 |
| EP | 0257619 | 7/1991 |
| EP | 0982341 | 3/2000 |
| EP | 1245608 | 10/2002 |
| EP | 1370600 | 12/2003 |
| EP | 1545020 | 6/2005 |
| FR | 1361218 | 4/1964 |
| JP | 53046907 | 4/1978 |
| JP | 55108823 | 8/1980 |
| JP | 61043629 | 3/1986 |
| JP | 04198126 | 7/1992 |
| RO | 62314 | 8/1977 |
| RO | 114124 | 1/1999 |
| RU | 2111741 | 5/1998 |
| RU | 2144823 | 1/2000 |
| WO | WO8700745 | 2/1987 |
| WO | WO8700754 | 2/1987 |
| WO | WO9908789 | 8/1990 |
| WO | WO0114456 | 3/2001 |
| WO | WO0188015 | 11/2001 |
| WO | WO03037298 | 5/2003 |
| WO | WO04000914 | 12/2003 |
| WO | WO2004006833 | 1/2004 |
| WO | WO2004081082 | 9/2004 |
| WO | WO2005007170 | 1/2005 |
| WO | WO2005049049 | 6/2005 |
| WO | PCT/US2006/003932 | 9/2006 |
| WO | PCT/US2006/003932 | 4/2008 |

* cited by examiner

REDUCED OLIGOMER CONCENTRATION IN HIGH PURITY POLYALKYLENE GLYCOLS

PRIOR RELATED APPLICATIONS

Not Applicable.

FEDERALLY SPONSORED RESEARCH STATEMENT

Not applicable.

REFERENCE TO MICROFICHE APPENDIX

Not applicable.

FIELD OF THE INVENTION

The invention relates generally to polyalkylene glycol compositions and methods of making such compositions. More particularly, the polyethylene glycol compositions described herein have a reduced concentration of low molecular weight oligomers.

BACKGROUND OF THE INVENTION

Polyethylene glycol (PEG) is used in a wide variety of applications including, but not limited to, excipients, plasticizers, softeners, humectants, ointments, polishes, paper coating, lubricants, bases for cosmetics and pharmaceuticals, solvents, binders, metal and rubber processing, and additives to foods and animal feed. Some particular uses of PEG in pharmaceutical applications include, for example, formation of PEG-drug conjugates, treatment of neonatal respiratory distress syndrome, treatment of constipation, treatment of encopresis in children, and diagnosis and therapy of gastrointestinal diseases.

Polyethylene glycol is typically produced by base-catalyzed ring-opening polymerization of ethylene oxide. The reaction is initiated by adding ethylene oxide to a diol in the presence of a catalyst. This process results in a polydispersed mixture of polyethylene glycol polymers with a Poisson distribution centered on the target molecular weight. For example, PEG 400 has a number average molecular weight of around 400, but contains a distribution of oligomers from ethylene glycol to much higher molecular weights; however, when these molecular weights are examined in aggregate the number average molecular weight will be at or around 400. It is generally expected that the number average molecular weight be within five percent of the labeled nominal value for polyethylene glycols with a labeled value of less than 1000 g/mol, within 10% for labeled values between 1000 g/mol and 7000 g/mol and within 12.5% for labeled values greater than 7000 g/mol.

While a majority of the oligomers in a particular polyethylene glycol composition have a molecular weight near the number average molecular weight, compositions typically also contain significant concentrations of lower molecular weight species. And while high molecular weight polyethylene glycol molecules appear to be inert in the body, low molecular weight polyethylene glycol polymers may interact with the human body, especially the liver. Consequently, the concentration of low molecular weight species such as ethylene glycol and diethylene glycol is specified in the United States Pharmacopeia to 0.25% (2,500 ppm) or less with respect to polyethylene glycols having a molecular weight of 1000 g/mol or less for use in fields with application to a living body. Because these low molecular weight polyethylene glycol molecules may interact with the body, polyethylene glycols having reduced concentrations of low molecular weight species would be useful.

SUMMARY OF THE INVENTION

Embodiments of the invention described herein include methods for making a polyalkylene glycol composition having reduced low molecular weight oligomers. In some embodiments, the method includes providing a catalyst and an initiator; providing an alkylene oxide; and maintaining the reaction temperature and concentration of water at a level sufficient to provide a polyalkylene glycol composition having a number average molecular weight range from about 3000 to about 10,000 g/mol, wherein the composition has a first total oligomer concentration of less than about 400 ppm of all oligomers having a molecular weight of less than or equal to 812 g/mol. In other embodiments, the method includes providing a catalyst and an initiator, providing an alkylene oxide, and maintaining the concentration of water at a level sufficient to provide a polyalkylene glycol composition having a number average molecular weight range from about 3000 to about 10,000 g/mol, and comprising a first total oligomer concentration of less than about 90 ppm of all oligomers having a molecular weight of less than or equal to 460 g/mol wherein the composition is obtained without further processing to remove oligomers having a molecular weight of less than about 460 g/mol.

Other embodiments of the invention are directed to polyethylene glycol compositions having reduced low-molecular weight oligomer concentrations. In some embodiments, the compositions have a number average molecular weight range from about 4000 to about 10,000 g/mol and comprise a first total oligomer concentration of about 400 ppm or less of all oligomers having a molecular weight of less than or equal to 812 g/mol and a second total oligomer concentration of less than about 50 ppm of all oligomers having a molecular weight of less than or equal to 240 g/mol.

In still other embodiments of the invention a polyethylene glycol composition with a bulk density of greater than about 0.50 g/cm$^3$ having a number average molecular weight range from about 3000 to about 10,000 g/mol, particularly about 3000 g/mol to about 4000 g/mol, comprises a first total oligomer concentration of less than about 400 ppm of all oligomers having a molecular weight of less than or equal to 812 g/mol and comprises a second total oligomer concentration of less than about 50 ppm of all oligomers having a molecular weight less than or equal to 240 g/mol.

Some compositions described herein are polyethylene glycols having a number average molecular weight range from about 3000 to about 10,000 g/mol, wherein the composition has a first total oligomer concentration of less than about 400 ppm of all oligomers having a molecular weight of less than or equal to 812 g/mol and a second total oligomer concentration of less than about 50 ppm of all oligomers having a molecular weight of less than or equal to 240 g/mol and comprises greater than 0.1 g of water per 1.0 g of polyethylene glycol.

In other embodiments, the polyalkylene glycol compositions herein have a number average molecular weight range from about 3000 to about 10,000 g/mol, particularly 4000 g/mol to 9000 g/mol and comprise a first total oligomer concentration of less than about 90 ppm of all oligomers having a molecular weight less than or equal to 460 g/mol wherein the composition is obtained without further processing to remove oligomers having a molecular weight of less than about 460 g/mol.

In some of the methods and compositions described herein the composition has a number average molecular weight ranging from about 3000 to about 4000 g/mol. In other embodiments, the number average molecular weight ranges from about 4000 to about 5000 g/mol. In still other embodiments the number average molecular weight range is from about 5000 to about 7000 g/mol. And in yet other embodiments, the number average molecular weight range is from about 7000 to about 9000 g/mol.

Some methods and compositions may also be characterized by one or more other features described herein. For example, in some embodiments, the compositions produced by the methods described herein may comprise solid product that has an average particle size of less than about 1 mm. Some embodiments are characterized by the absence of or lack of need for an antioxidant. Some compositions provided herein are particularly suited for use in pharmaceutical applications.

BRIEF DESCRIPTION OF THE DRAWINGS

Embodiments of the invention may be understood from the following detailed description when read with the accompanying figures. Reference is now made to the following descriptions taken in conjunction with the accompanying drawings, in which.

DESCRIPTION OF EMBODIMENTS OF THE INVENTION

Definitions

Figure 1:
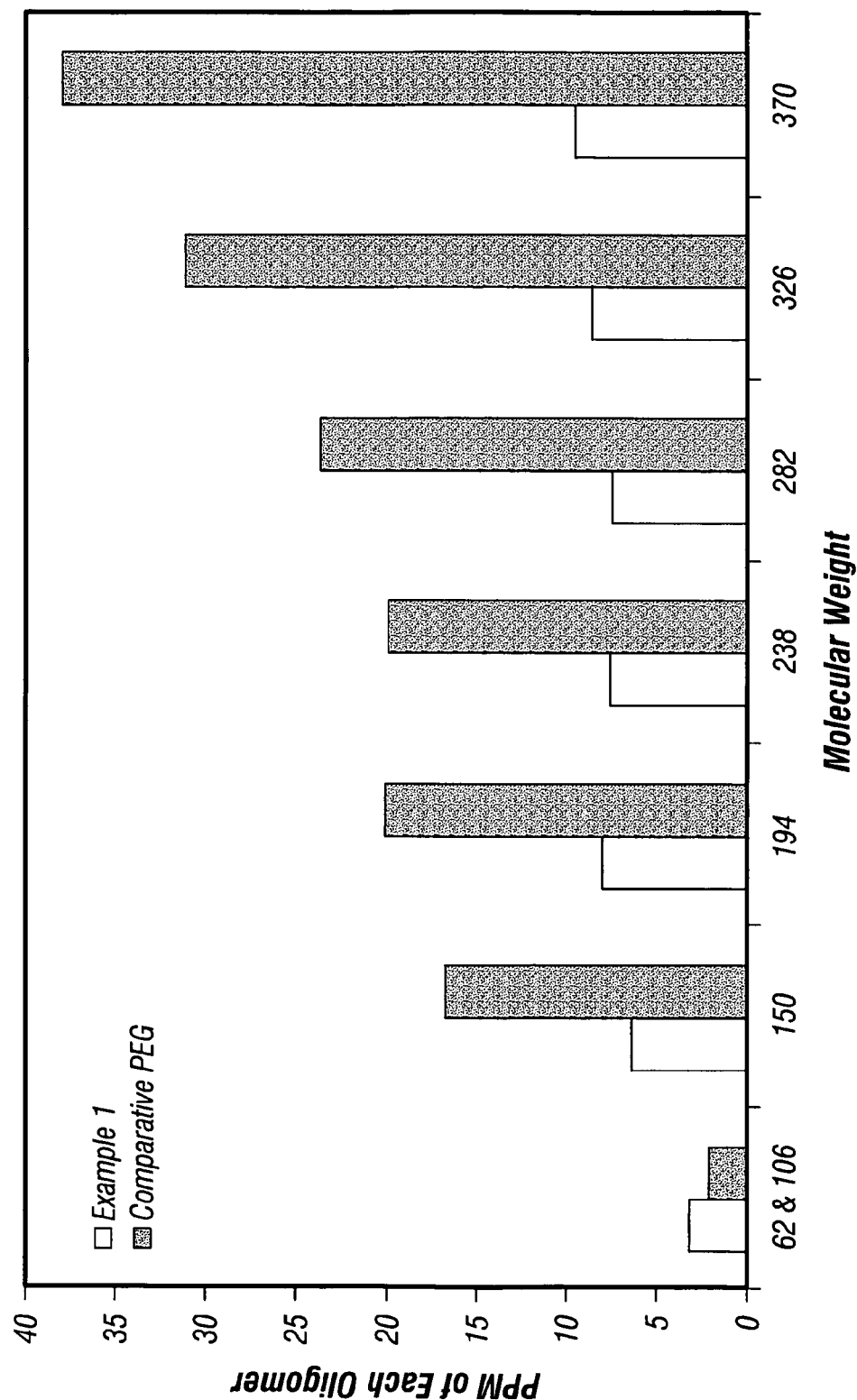
FIG. 1 compares a low molecular weight oligomer concentration profile of polyethylene glycol with a molecular weight of about 3350 produced by conventional methods and that of a polyethylene glycol with a molecular weight of about 3350 composition of an embodiment of the invention.
Figure 2:
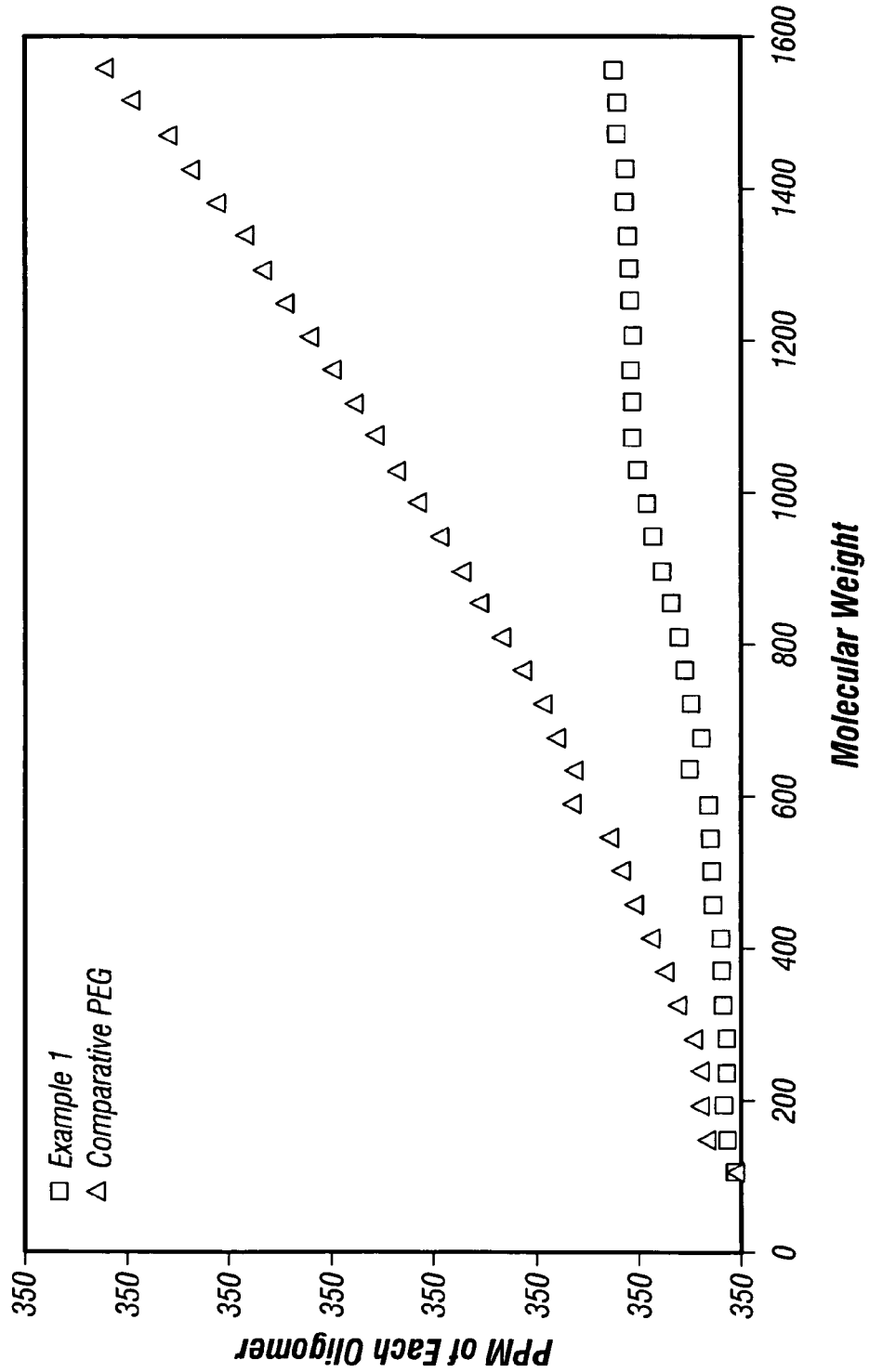
FIG. 2 compares a larger portion of the low molecular weight oligomer concentration profile of polyethylene glycol with a molecular weight of about 3350 produced by conventional methods and that of a polyethylene glycol with a molecular weight of about 3350 composition of an embodiment of the invention.

In the following description, all numbers disclosed herein are approximate values, regardless whether the word "about" or "approximate" is used in connection therewith. They may vary by 1%, 2%, 5%, and sometimes, 10 to 20%. Whenever a numerical range with a lower limit, $R^L$ and an upper limit, $R^U$, is disclosed, any number falling within the range is specifically disclosed. In particular, the following numbers within the range are specifically disclosed: $R=R^L+k^*(R^U-R^L)$, wherein k is a variable ranging from 1% to 100% with a 1% increment, i.e., k is 1%, 2%, 3%, 4%, 5%, ..., 50%, 51%, 52%, ..., 95%, 96%, 97%, 98%, 99%, or 100%. Moreover, any numerical range defined by two R numbers as defined in the above is also specifically disclosed.

In one aspect, the invention provides polyethylene glycol compositions having low concentrations of low molecular weight oligomers of polyethylene glycol. Low molecular weight oligomers of polyethylene glycol are molecules that are members of the polyethylene glycol family, but have a low molecular weight. For example, diethylene glycol and triethylene glycol are low molecular weight oligomers of polyethylene glycol that are sometimes referred to as the 2-mer and 3-mer of polyethylene glycol, respectively. Oligomers are generally referred to herein by their characteristic molecular weight, for example the pentamer and decamer may be identified as the 238 g/mol and the 458 g/mol oligomers, respectively.

Where the term molecular weight is applied to compositions having a distribution of molecular weight it should be understood that the number average molecular weight be within five percent of the reported nominal value for polyethylene glycols with a reported value of less than 1000 g/mol, within 10% for reported values between 1000 and 7000 g/mol and within 12.5% for reported values greater than 7000 g/mol. For example, a polymer composition described as having a number average molecular weight of 3350 g/mol should be construed to literally cover compositions with number average molecular weights ranging from 3015 g/mol to about 3685 g/mol.

In some embodiments, the invention provides a polyalkylene glycol composition, such as a polyethylene glycol, having a number average molecular weight range from about 3000 g/mol to about 10,000 g/mol, comprising a first total oligomer concentration of less than about 400 ppm of all oligomers having a molecular weight of less than or equal to 812 g/mol. In some embodiments, the first total oligomer concentration is less than about 350 ppm, 275 ppm, 200 ppm, or 100 ppm. In other compositions, the first total concentration of oligomers may be even lower.

Some compositions may also be characterized by a second total oligomer concentration. In some compositions, there is less than about 50 ppm of all oligomers having a molecular weight of 240 g/mol or less. Other compositions have even lower concentrations of all such oligomers. For example, some compositions may have less than about 40 ppm, less than about 30 ppm, less than about 20 ppm, less than about 10 ppm, or less than about 5 ppm of all oligomers with a molecular weight of less than or equal to 240 g/mol.

Compositions may also be characterized by a third total oligomer concentration. Thus, some compositions comprise less than about 1500 ppm of all oligomers with a molecular weight of 1472 g/mol or less. In some embodiments, the compositions comprise less than about 1400 ppm, less than about 1250 ppm, less than about 1000 ppm, less than about 750 ppm, less than about 500 ppm, or less than about 100 ppm of all such oligomers.

Particular compositions comprise desirable combinations of the first, second or third total oligomer concentrations. For instance some compositions comprise a first total oligomer concentration of less than about 400 ppm of all oligomers having a molecular weight of 812 g/mol or less, a second total oligomer concentration of less than about 50 ppm of all oligomers having a molecular weight of 240 g/mol or less, and a third total oligomer concentration of less than about 1500 ppm of all oligomers having a molecular weight of 1472 g/mol or less. Some compositions have a first total oligomer concentration of less than about 275 ppm of all oligomers having a molecular weight of 812 g/mol or less and a second total oligomer concentration of less than about 50 ppm of all oligomers having a molecular weight of 240 g/mol or less.

In another aspect, some compositions provided herein are obtained without one or more processing or post-reaction steps designed to remove oligomers having a molecular weight of 460 g/mol or less. Thus, some polyethylene glycol compositions obtained without one or more such steps have the first total oligomer concentration of less than about 90 ppm of all such oligomers. Other compositions comprise less than about 85 ppm, less than about 80 ppm, less than about 75 ppm, less than about 70, less than about 60, less than about 50, less than about 40, less than about 30, less than about 20, less than about 10 or less than about 5 ppm of all oligomers of 460 g/mol or less.

Particular compositions that are obtained without further processing to remove low molecular weight oligomers comprise low concentrations of other oligomers as well. For instance, some compositions obtained without further processing also comprise a second total oligomer concentration of less than about 50 ppm of all oligomers with a molecular weight of 240 g/mol or less. In some compositions, the total concentration of oligomers with a molecular weight of 240 g/mol or less may be less than about 40 ppm, less than about 30 ppm, less than about 20 ppm, less than about 10 ppm, or less than about 5 ppm. Other polyethylene glycol compositions obtained without further processing are characterized by the low levels of oligomers with a molecular weight of 1472 g/mol or less. Thus, some compositions with a first total oligomer concentration of less than about 90 ppm of all oligomers with a molecular weight of 460 g/mol or less also have a third total concentration of oligomers of less than about 1500 ppm of all oligomers with a molecular weight of 1472 g/mol or less. In some compositions, the total concentration of all oligomers having a molecular weight of less than or equal to 1472 g/mol is less than about 1400 ppm, less than about 1250 ppm, less than about 1000 ppm, or less than about 750 ppm. In some embodiments, the total concentration of all oligomers having a molecular weight of less than or equal to 1472 g/mol is less than about 500 ppm, less than about 250 ppm, or less than about 100 ppm.

While the compositions herein may have any desirable molecular weight in the range of 3,000 to about 10,000 g/mol, particular compositions described above have a number average molecular weight ranging from about 3000 g/mol to about 4000 g/mol, preferably about 3350 g/mol. Some compositions have a molecular weight ranging from 4000 g/mol to 7000 g/mol. In some embodiments, compositions having the total oligomer concentrations described above also have a number average molecular weight ranging from about 4000 g/mol to about 5000 g/mol, more particularly 4000 g/mol to about 4400 g/mol. In other embodiments, the number average molecular weight ranges from about 5000 g/mol to about 7000 g/mol, particularly about 4750 g/mol to about 6000 g/mol, more particularly about 4750 g/mol to about 5250 g/mol, even more particularly about 5000 g/mol. In still other embodiments, the number average molecular weight of the composition ranges from about 7000 g/mol to about 9000 g/mol, particularly about 7500 g/mol to about 8500 g/mol. Some preferred compositions have a number average molecular weight of about 8000 g/mol.

The number average molecular weight and oligomer concentration may be determined using the method described in United States Pharmacopeia 28/National Formulary 23, published by Pharmacopeial Convention, Inc., for the measurement of average molecular weight of polyethylene glycol. The concentration of low molecular weight oligomers may be determined by analysis of 3,5-dinitrobenzoyl chloride derivatives of polyethylene glycol. The derivatized samples may be injected onto an HPLC (High Performance Liquid Chromatography) system for separation and subsequent detection by UV spectroscopy. The chromatographic response, molecular weight(s), and retention times of ethylene glycol, di(ethylene glycol), tri(ethylene glycol), tetra(ethylene glycol), and penta (ethylene glycol) standards are used to calculate the molar response factor for this analysis.

Regardless of the molecular weight and the total oligomer concentration, some polyethylene glycol compositions of the invention may comprise solid particles having an average particle size of less than about 1 mm. The lower limit on the particle size in some embodiments may be about 1 micron, about 5 microns, about 20 microns, about 50 microns, 100 microns, 500 microns, or about 1000 microns. In certain embodiments, the upper limit of the average particle size may have a value of about 100 microns, 200 microns, 500 microns and 1000 microns. Average particle sizes may be determined from commercially available laser diffraction devices, such as the Malvern S® particle size analyzer.

The particles may also be characterized by their size distribution. As used herein, the terms "$D_{10}$", "$D_{50}$" and "$D_{90}$" indicate the respective percentiles of log normal particle size distribution determined by means of the Malvern S® particle size analyzer used to analyze dry particles.

Some compositions of the invention may comprise particles having a $D_{50}$ value ranging from about 1 microns to about 1,000 microns, although in some embodiments the $D_{50}$ value may fall outside this range. In some embodiments, $D_{50}$ may be between about 50 microns to about 500 microns. In other embodiments, the $D_{50}$ value may be about 100 microns, about 200 microns, about 300 microns, or about 400 microns. In yet other embodiments, the $D_{50}$ value may be about 10 microns, about 25 microns, about 50 microns, or about 75 microns.

The width or narrowness of a particle size distribution can be described by its span. The span is defined as $(D_{90}-D_{10})/(D_{50})$. Some compositions may comprise particles having a span of about 0.8 to about 3.0. In some embodiments, the span may be about 1.2, about 1.3, about 1.4, or about 1.5. In other embodiments, the span of the particles may be about 1.6, or about 1.8, about 2.0, about 2.2, or about 2.5. In still other embodiments, the particles may have a span less than about 2.0, less than about 1.8, or less than about 1.6. Other compositions may be prepared wherein the particles have a span that is less than about 1.5, about 1.3, or about 1.1. The desirable span varies with the application.

Alternatively or in addition, some solid compositions described herein have a desirable bulk density. The bulk density of some of the solid polyethylene glycol compositions described herein is greater than about 0.50, typically greater than 0.52, or 0.55 g/cm3. In other embodiments the bulk density may be about 0.60 about 0.65 about 0.68, about 0.70, about 0.75 or about 0.80 g/cm$^3$. Typically, the bulk density does not exceed about 1.1 g/cm$^3$ In some embodiments, the density is less than about 0.95 g/cm$^3$, less than about 0.90 g/cm$^3$, less than 0.85 g/cm$^3$, less than 0.80 g/cm$^3$, less than 0.75 g/cm$^3$, less than 0.70 g/cm$^3$, or less than about 0.65 g/cm$^3$. Typically the bulk density ranges from about 0.50 to about 0.75 g/cm$^3$. The bulk density of polyethylene glycol compositions may be measured according to United States Pharmacopeia, Method 616 entitled "Bulk Density and Tapped Density." Accordingly, if agglomerates are present in the material the quantity of material sufficient to complete the test should be passed through a 1.00 mm (No. 18) screen to break up agglomerates that may have formed during storage. The bulk density is determined by adding approximately 100 g of test material, M, with 0.1% accuracy without compacting by pouring or carefully transferring using spatula to a dry 250-mL cylinder. For the compositions herein, typically about 80 to 90 grams is suitable to fill the cylinder. The powder should be carefully leveled without compacting, if necessary, and read the unsettled apparent volume, Vo, to the nearest graduated unit. Calculate the bulk density, in g per mL, by the formula: (M)/(Vo). Generally replicate determinations and typical statistical methods are desirable for the determination of this property.

The compositions described herein may be made by any suitable method. One such method comprises providing a catalyst and an initiator; providing an alkylene oxide, and maintaining the reaction temperature and the concentration of water at a level sufficient to provide a polyethylene glycol composition having a number average molecular weight range from about 3000 to about 10,000 g/mol, comprising a first total oligomer concentration of less than about 400 ppm of all oligomers having a molecular weight of 812 g/mol or less and a second total oligomer concentration of less than about 50 ppm of all oligomers having a molecular weight of less than or equal to 240 g/mol.

In another embodiment, the method of making a polyalkylene glycol composition having reduced low molecular weight oligomers comprises providing a catalyst and an initiator; providing an alkylene oxide; and maintaining the temperature and concentration of water at a level sufficient to provide a polyethylene glycol composition having a number average molecular weight range from about 3000 to about 10,000 g/mol, comprising a first total oligomer concentration of less than about 90 ppm of all oligomers having a molecular weight of less than or equal to 460 g/mol wherein the method is free of post-reaction processing steps to remove oligomers having a molecular weight of less than or equal to about 460 g/mol.

Without wishing to be held to any particular theory, it is believed that the presence of water in the reactants promotes the formation of low molecular weight oligomers. It is thought that water that is introduced in the initiator via the catalyst or some other form of contamination is ethoxylated to form low molecular weight oligomers. In particular, the presence of water in higher molecular weight initiators (or in the final stages of ethoxylation) is thought to have a significant impact on the low molecular weight oligomer distribution.

Surprisingly the impact of water as an impurity in the diol initiator increases as the molecular weight of the initiator approaches the molecular weight of the final product. Thus, in embodiments of the methods herein, introducing water into higher molecular weight initiators should be carefully controlled. In particular embodiments, the water, such as water from the catalyst solution should be added when the initiator has a relatively low molecular weight. The relatively low molecular weight is determined with respect to the molecular weight of the final composition. Thus, the points of reaction where water should be controlled will be different when the molecular weight of the desired composition is, for example, 3350 g/mol rather than 8000 g/mol.

In addition to being provided with the catalyst, water may also be present as an impurity in alkylene oxides, particularly ethylene oxide. Like water introduced from the catalyst, water present in the alkylene oxide results in low molecular weight oligomers in the latter stages of ethoxylation. Thus, in some embodiments, providing an alkylene oxide includes providing an alkylene oxide having less than about 100 ppm water. In other embodiments, the alkylene oxide comprises less than about 50 ppm, particularly less than about 10 ppm water.

According to some embodiments of the invention, the water level is kept below one or more of the levels indicated in Table 1. For example, at a time when the polyethylene glycol has a molecular weight of 1000 g/mol, the water level in the reactor or reaction mixture is maintained below 0.14 weight percent if the desired molecular weight of the final composition is 3350 g/mol. Likewise if the desired molecular weight of the final composition is 8000 g/mol, the amount of water in the reactor or reaction mixture is kept below 1.5 weight percent at a time when the composition has a molecular weight of 1000 g/mol.

TABLE 1

| Molecular weight of PEG during Ethoxylation | PEG 3350 (Target final MW) | PEG 4000 (Target final MW) | PEG 6000 (Target final MW) | PEG 8000 (Target final MW) |
|---|---|---|---|---|
| 106 | 5.5 | 8.8 | 22 | 37 |
| 200 | 2.5 | 4 | 10 | 16.7 |
| 300 | 1.4 | 2.3 | 5.7 | 9.7 |
| 400 | 0.89 | 1.5 | 3.8 | 6.5 |
| 500 | 0.61 | 1 | 2.7 | 4.6 |
| 600 | 0.43 | 0.71 | 1.9 | 3.5 |
| 700 | 0.32 | 0.53 | 1.5 | 2.7 |
| 800 | 0.24 | 0.4 | 1.2 | 2.2 |
| 900 | 0.18 | 0.31 | 0.92 | 1.8 |
| 1000 | 0.14 | 0.24 | 0.74 | 1.5 |
| 1200 | 0.09 | 0.16 | 0.5 | 1.1 |
| 1400 | 0.055 | 0.1 | 0.35 | 0.74 |
| 1600 | 0.036 | 0.067 | 0.26 | 0.56 |
| 2000 | 0.016 | 0.032 | 0.14 | 0.33 |
| 2400 | 0.008 | 0.016 | 0.08 | 0.21 |
| 2800 | 0.004 | 0.009 | 0.048 | 0.14 |
| 3350 | 0.002 | 0.004 | 0.025 | 0.076 |
| 3750 | 0.001 | 0.003 | 0.016 | 0.052 |
| 4000 |  | 0.002 | 0.012 | 0.042 |
| 4400 |  | 0.001 | 0.0072 | 0.029 |
| 5000 |  |  | 0.0038 | 0.017 |
| 6000 |  |  | 0.0013 | 0.007 |
| 6600 |  |  | 0.0007 | 0.005 |
| 7000 |  |  |  | 0.004 |
| 8000 |  |  |  | 0.002 |
| 9000 |  |  |  | 0.001 |

In accordance with the values of Table 1, in some embodiments the concentration of water in the reactor is related to the molecular weight of an intermediate polyethylene glycol polymer, $M_w^{int}$, in the reactor at one or more intermediate times, $t_i$, and the final desired molecular weight of the polyethylene glycol composition, $M_w^{fin}$, follows the formula:

$$Wt\%H_2O \leq a_1 - a_2(M_w^{fin}) - a_3\left(\frac{1}{M_w^{int}}\right) - $$
$$a_4(M_w^{fin} - a_5)\left(\left(\frac{1}{M_w^{int}}\right) - a_6\right) + a_7(M_w^{fin})^2\left(\frac{1}{M_w^{int}}\right) - a_8\left(\frac{1}{M_w^{int}}\right)^2 + $$
$$a_9(M_w^{fin})\left(\frac{1}{M_w^{int}}\right)^2 - a_{10}\left(\frac{1}{M_w^{int}}\right)^3 - a_{11}(M_w^{fin} - a_{12})\left(\left(\frac{1}{M_w^{int}}\right)^3 - a_{13}\right);$$

wherein $a_i$ are constants derived from empirical data reported in Table 1. Values for the "$a_n$" constants for cases where the intermediate composition has a molecular weight of less than 2000 g/mol and wherein the intermediate composition has a molecular weight of greater than 2000 g/mol are recorded in Table 2.

TABLE 2

Constants for Concentration of Water in Reactor

| Constant | $M_w^{int} \leq 2000$ g/mol | $M_w^{int} > 2000$ g/mol | Constant | $M_w^{int} \leq 2000$ g/mol | $M_w^{int} > 2000$ g/mol |
|---|---|---|---|---|---|
| a1 | 1.92 | 0.404 | a8 | $2.25 \times 10^5$ | $6.20 \times 10^5$ |
| a2 | $3.8 \times 10^{-4}$ | $5.9 \times 10^{-5}$ | a9 | 98.8 | 353 |
| a3 | 260 | 1070 | a10 | $1.86 \times 10^7$ | 0 |
| a4 | 0.0427 | 0.19 | a11 | 5380 | 0 |
| a5 | 5590 | 6040 | a12 | 5590 | 0 |
| a6 | $1.54 \times 10^{-3}$ | $2.6 \times 10^{-4}$ | a13 | $4.78 \times 10^{-8}$ | 0 |
| a7 | $2.8 \times 10^{-5}$ | $1.49 \times 10^{-5}$ | | | |

In some embodiments, lower water concentrations are desired. For instance the values calculated using the above equations serve to define an upper limit on the water concentration for some embodiments. In other embodiments, the water concentration in the reactor at a given time can range from 0 to 99 percent of the value given by the formula above. In particular embodiments, the concentration of water in the reactor at a given time can be 5, 10, 20, 30, 40, 50, 60, 70, 80, or 90 percent of the value produced by the formula. Provided that the water concentration and temperature are maintained in the desired range, polyethylene glycol may be made in conjunction with any additional process. For example, processes described in U.S. Pat. Nos. 6,372,927, 6,620,976, 4,721,816, as well as U.S. Pat. App. Pub. No. 2002161267, and published application WO2004081082, the disclosure of each of these references is incorporated herein by reference in their entirety.

In some embodiments a sufficiently low level of water in the reactor means that there is less than 1.5 wt. percent water in the reactor when the molecular weight Mw of the polyethylene glycol in the reactor is 1000 g/mol or less. In some embodiments the concentration of water in the reactor ranges can be 1.0 wt. percent or less, 0.8 wt. percent or less, 0.7 wt. percent or less, 0.5 wt. percent or less, 0.3 wt. percent or less, or 0.1 wt. percent or less when the molecular weight Mw of the polyethylene glycol in the reactor is 1000 g/mol or less. It should be recognized that the polyethylene glycol having a molecular weight of 1000 g/mol need not be isolated or used as an initiator in the subsequent preparation of the desired composition. Rather in such embodiments, the water content of the composition when it has a molecular weight of 1000 g/mol is determinative. For example, it is envisioned that an initial polyethylene glycol having a molecular weight of greater or less than 1000 g/mol may be prepared and further used to prepare a desired higher molecular weight composition. Regardless of the molecular weight of the initial polyethylene glycol, the water level can be determined when the composition achieves a molecular weight of 1000 g/mol, or as close to 1000 g/mol as practicably possible.

Any initiator suitable for preparing polyalkylene glycols may be used. Particular initiators include poly(oxyethylene) compounds. Other suitable initiators include, diols having from 2 to 4 carbon atoms or active hydrogen initiators. In some embodiments, a diethylene glycol or ethylene glycol initiator is particularly preferred.

Providing the alkylene oxide can be done by any suitable means. The alkylene oxide can be any suitable such compound. Typically, the alkylene oxide has from 2 to 10 carbon atoms, particularly ethylene oxide or propylene oxide. Of course, where a polyethylene glycol is desired ethylene oxide should be used.

Any now-known or later-discovered catalyst may be used. Some suitable catalysts include potassium hydroxide, sodium hydroxide, ammonium hydroxide, metal oxide catalysts, alkaline earth oxides, antimony hexafluoride, and antimony hexachloride. In particular embodiments, the catalyst includes sodium hydroxide, preferably as a 50% solution in water. However, care should be taken to minimize the presence of water in the reaction, especially in those embodiments where an initial portion of low molecular weight polyethylene glycol is formed and further reacted to provide a desired higher molecular weight polyethylene glycol composition. Other widely used catalysts include Na, K, NaH, KH, KOMe, KOEt, NaOMe, NaOEt and Na metal. Various metal oxides, metal salts, phosphazenium compounds, rare-earths and double metal cyanide (DMC) catalysts have also been used as alkoxylation catalysts. Other catalysts described in U.S. Pat. Nos. 6,303,832, 5,120,697, 5,026,923, 5,104,987, 5,466,523, 5,844,115, 4,727,199, 4,946,984, 4,721,816, 6,207,794, 6,018,017, 6,429,342, 6,376,721, 5,023,224, 5,057,628, and 5,102,849 as well as in published applications WO2004081082, WO2001014456, and in Romanian patent RO62314B, the disclosure of each of these references is incorporated herein by reference in their entirety.

The components may be combined and allowed to react in any suitable reactor configuration or process. Preferably, after the catalyst is added to the diol initiator, ethylene oxide or another alkoxylate is added. These alkoxylates are added until the desired molecular weight is achieved. In some embodiments the alkoxylates have water concentrations of less than about 50 ppm, less than about 25 ppm, or less than about 10 ppm water. Typically, alkoxylation reactions are carried out batchwise by heating the initiator in the presence of the catalyst and adding the alkoxylate. Some suitable reactor designs and processes are disclosed in U.S. Pat. Nos. 6,372,927, 6,620,976, 4,721,816, U.S. Pub. Appl. No. 2002161267, and Int'l Application WO2004081082, each of which is incorporated herein by reference in its entirety. Some suitable reactor schemes include stirred tank reactors, plug-flow reactors, fixed bed reactors or loop reactors. In some embodiments, a single batch process is used. In some processes two or more reactors are used. In those embodiments where two or more reactors are used, the reactors may be serially connected. In other embodiments, the reactors may be isolated batch reactors. In other embodiments, compositions may be made by forming a first lower molecular weight polyethylene glycol composition. Thereafter, some or all of this lower molecular weight composition is further reacted to produce a higher molecular weight polyethylene glycol composition. Preferably, no additional catalyst is added to the reaction in embodiments where at least a portion of a first lower molecular weight polyethylene glycol composition is further reacted to form the desired higher molecular weight composition especially those where the catalyst used to form the first low molecular weight portion includes water or reacts with the initiator to form water.

Regardless of the particular design, the temperature of the reaction should be carefully controlled. In some embodiments, the method further includes maintaining the reaction at a temperature of less than about 165° C. Reaction temperatures from about 120° C. to about 160° C., from about 130° C. to about 155° C., or 135° C. to about 150° C. are suitable for some embodiments.

Methods of the invention may also include neutralizing the catalyst once the polyethylene glycol composition has been formed. Typically, the catalyst is neutralized with an acid, such as but not limited to mineral acids and organic acids. Phosphoric acid and acetic acid are particularly suitable for neutralizing basic catalysts such as NaOH and KOH. Other catalyst neutralization suitable procedures are described in U.S. Pat. Nos. 4,110,268, 4,430,490, 4,521,548, 5,468,839, 4,426,301, and 6,191,315. The use of carbon dioxide is disclosed in U.S. Pat. Nos. 3,833,669, 4,129,718, and 4,137,398. The disclosure of each of these references is incorporated herein by reference in their entirety and may be used according to some methods of the invention.

Embodiments of the invention can also include removing all or some of the catalyst from the polyethylene glycol composition. Any suitable means may be used provided that it does not deteriously affect the composition, such as by increasing the concentration of low molecular weight oligomers of polyethylene glycol in the composition. Removing the catalyst using one or more acids is disclosed in U.S. Pat. Nos. 3,299,151, 4,306,943, 4,507,475, 4,967,017, 5,012,013, 5,468,840, 6,410,676, and Int'l Applications WO2001088015 and WO2004000914. The catalyst can also be removed by centrifugation, filtration, or other chemical means as disclosed in U.S. Pat. Nos. 4,254,287, 4,482,750, 4,528,364, 4,855,509, 4,877,906, 4,721,818, 4,987,271, 5,344,996, 5,811,566, European Patent EP1370600, and Chinese Patent CN1044472. Each of these disclosures is incorporated herein by reference in its entirety.

The polyethylene glycol compositions can also be treated by one or more of the following processes. In some embodiments, the composition may be subjected to water extraction as described in U.S. Pat. No. 6,504,062 or ion exchange as described in U.S. Pat. No. 2,812,360. In some embodiments reactive distillation can be used to treat the compositions as described in U.S. Pat. No. 5,268,510 and European Patent EP982341. If desired, the compositions may be passed through a membrane as described in U.S. Pat. Nos. 4,946,939 and 5,434,315. In some embodiments, the process includes removing volatiles from the composition as described in U.S. Pat. No. 4,443,634. Removal of unsaturated components using ultra-filtration is described in U.S. Pat. No. 5,767,324 and by hydrogenation in Japanese Patent JP53046907. In some embodiments it may be desirable to remove unwanted color from the compositions by using a bleaching agent as described in U.S. Pat. App. Pub. No. 2005009695, by cation exchange as described in JP61043629. In other embodiments, the compositions may be treated with silicate and aluminum oxide as described in JP 55108823. Hydrogen peroxide may also be used as described in RO114124. In some embodiments, the color is removed by heating the composition in the presence of water and air as described in U.S. Pat. No. 4,751,331. Each of these disclosures is incorporated herein by reference in its entirety.

The polyethylene glycols described herein may be prepared for use in a variety of applications. Some compositions described herein are suitable for use as laxatives or lavages. Some compositions may be used to treat chronic gastrointestinal disorder selected from the group consisting of ulcerative colitis, Crohn's disease, and irritable bowel syndrome as described in U.S. Pat. No. 5,443,826 and WO2005007170. Some polyethylene glycol compositions described herein may be useful for treating or preventing intestinal gas, cramping or anorectal irritation. Some compositions are suitable for use as a suspending agent as described in U.S. Pat. No. 4,942,042. In particular embodiments, the compositions may be used as a laxative either alone or along with electrolytes as described in U.S. Pat. No. 6,645,481, WO2005049049, WO8700745. The use of polyethylene glycol compositions and electrolytes is also described in U.S. Pat. Nos. 5,274,001, 5,124,144, 5,077,048, U.S. Pat. App. Pub. No. 20030202957, WO2003037298, WO2004006833, German Patent DE3807712, and Japanese Patent JP04198126. Some compositions may be suitable for use as described in U.S. Pat. Appl. Publ. No. 2001051659. Some compositions may be used as described in U.S. Pat. Nos. 5,074,842, 5,710,183, 3,495,010, 6,444,198 and Russian patents RU2144823 and RU2111741. Each of these disclosures is incorporated herein by reference in its entirety.

Some compositions have been taught to be useful as food additives, particularly in reduced calorie formulations as described in U.S. Pat. Nos. 6,955,812. Polyethylene glycol compositions of some embodiments of the invention may be used as a softening agent, particularly in cosmetic formulations or as a carrier or filler in pharmaceutical applications. One skilled in the art will realize that technical grade compositions, or compositions not prepared to meet pharmaceutical standards, will not be suitable for such uses.

EXAMPLES

Comparative Example A

First a polyethylene glycol starter with a molecular weight of 1000 is made by providing 44.2 grams of diethylene glycol initiator, 0.4 gram of a 50% solution of NaOH and 410 grams of ethylene oxide having less than about 100 ppm of water The reaction is carried out at between 155° C. and 170° C. to produce a polyethylene glycol intermediate with a number average molecular weight of around 1000.

A 135 gram portion of the above material is reacted with 339 grams of high purity ethylene oxide and 0.2 g of 50% solution of NaOH while the temperature is maintained between 155° C. and 170° C. followed by neutralization to a pH of 4.5-7.5, typically using phosphoric acid, acetic acid or a blend thereof. The resulting polyethylene glycol has a molecular weight of about 3350 g/mol.

Analysis of the low molecular weight oligomers shows that such a composition has a total concentration of 59 ppm of all oligomers with a molecular weight of less than or equal to 240 g/mol, 248 ppm of all oligomers with a molecular weight of less than or equal to 460 g/mol, 948 ppm of all oligomers with a molecular weight of less than or equal to 812 g/mol; and 3965 ppm of all oligomers with a molecular weight of less than or equal to 1472 g/mol. For comparison these values are recorded in Table 3.

Comparative Example B

The procedure of Comparative Example A was repeated except that an increased amount of catalyst, 1.0 grams of a 50% solution of NaOH, was used and the catalyzed diethylene glycol initiator was dried to <0.4% wt. water prior to ethoxylation of the intermediate polyethylene glycol which had a number average molecular weight of about 1000 g/mol and the subsequent ethoxylation to 3350 g/mol was not recatalyzed with NaOH.

Analysis of the low molecular weight oligomers shows that such a composition has a total concentration of 72 ppm of all oligomers with a molecular weight of less than or equal to 240 g/mol, 208 ppm of all oligomers with a molecular weight of less than or equal to 460 g/mol, 644 ppm of all oligomers with a molecular weight of less than or equal to 812 g/mol; and 2313 ppm of all oligomers with a molecular weight of less than or equal to 1472 g/mol. For comparison these values are recorded in Table 3.

Comparative Example C

The procedure of Comparative Example A was substantially repeated except the temperature was reduced from 155-170° C. to 145-155° C. Analysis of the low molecular weight oligomers shows that such a composition has a total concentration of 28 ppm of all oligomers with a molecular weight of less than or equal to 240 g/mol, 151 ppm of all oligomers with a molecular weight of less than or equal to 460 g/mol, 668 ppm of all oligomers with a molecular weight of less than or equal to 812 g/mol; and 2994 ppm of all oligomers with a molecular weight of less than or equal to 1472 g/mol. For comparison these values are recorded in Table 3.

Comparative Example D

Polyethylene glycol having a target molecular weight 8000 g/mol is prepared by forming a polyethylene glycol starter with a molecular weight of 1000 g/mol by providing 44.2 grams of diethylene glycol initiator, 0.4 gram of a 50% solution of NaOH and 410 grams of ethylene oxide having less than about 100 ppm of water. The reaction is carried out at between 155° C. and 170° C. to provide a sample of relatively low molecular weight polyethylene glycol.

A 44.3 gram portion of the above material is reacted with 413 grams of high purity ethylene oxide and 0.2 g of 50% solution of NaOH while the temperature is maintained between 155° C. and 170° C. followed by neutralization to a pH of 4.5-7.5, typically using phosphoric acid, acetic acid or a blend thereof. The resulting polyethylene glycol has a molecular weight of about 8000 g/mol.

Analysis of the low molecular weight oligomers shows that such a composition has a total concentration of 74 ppm of all oligomers with a molecular weight of less than or equal to 240 g/mol, 235 ppm of all oligomers with a molecular weight of less than or equal to 460 g/mol, 679 ppm of all oligomers with a molecular weight of less than or equal to 812 g/mol; and 2693 ppm of all oligomers with a molecular weight of less than or equal to 1472 g/mol. For comparison these values are recorded in Table 3.

Example 1

Polyethylene glycol having a target molecular weight 3350 g/mol is prepared by forming a polyethylene glycol starter with a molecular weight of 1000 g/mol by providing 44.2 grams of diethylene glycol initiator and 1 gram of a 50% solution of NaOH. The catalyzed initiator solution is then dried to less than 0.4% by weight water and 356 grams of ethylene oxide having less than about 100 ppm of water is added. The reaction is carried out between 155° C. and 170° C. to provide a polyethylene glycol having a molecular weight of about 1000 g/mol.

A 135 gram portion of the above material is reacted with 339 grams of high purity ethylene oxide and 0.0 g of 50% solution of NaOH while the temperature is maintained between 145° C. and 155° C. followed by neutralization to a pH of 4.5-7.5, typically using phosphoric acid, acetic acid or a blend thereof. The resulting polyethylene glycol has a molecular weight of about 3350 g/mol. The loose bulk density for this material is 0.69 g/cm$^3$.

Analysis of the low molecular weight oligomers shows that such a composition has a total concentration of 25 ppm of all oligomers with a molecular weight of less than or equal to 240 g/mol, 75 ppm of all oligomers with a molecular weight of less than or equal to 460 g/mol, 246 ppm of all oligomers with a molecular weight of less than or equal to 812 g/mol; and 1009 ppm of all oligomers with a molecular weight of less than or equal to 1472 g/mol. For comparison these values are recorded in Table 3.

Example 2

Polyethylene glycol having a target molecular weight of 8000 g/mol is prepared by forming a polyethylene glycol starter with a molecular weight of 1000 g/mol by providing 44.2 grams of diethylene glycol initiator and 1 gram of a 50% solution of NaOH. The catalyzed initiator solution is then dried to less than 0.4% by weight water and 356 grams of ethylene oxide having less than about 100 ppm of water is added. The reaction is carried out at between 155° C. and 170° C. to provide a polyethylene glycol having a molecular weight of about 1000 g/mol.

A 50 gram portion of the above material is reacted with 370 grams of high purity ethylene oxide and 0.0 g of 50% solution of NaOH while the temperature is maintained between 135° C. and 145° C. followed by neutralization to a pH of 4.5-7.5, typically using phosphoric acid, acetic acid or a blend thereof. The resulting polyethylene glycol has a molecular weight of about 8000 g/mol. The loose bulk density for this material is 0.61 g/cm$^3$.

Analysis of the low molecular weight oligomers shows that such a composition has a total concentration of 18 ppm of all oligomers with a molecular weight of less than or equal to 240 g/mol, 64 ppm of all oligomers with a molecular weight of less than or equal to 460 g/mol, 193 ppm of all oligomers with a molecular weight of less than or equal to 812 g/mol, and 450 ppm of all oligomers with a molecular weight of less than or equal to 1472 g/mol. For comparison these values are recorded in Table 3.

Comparative Example E

A commercially available polyethylene glycol having a reported molecular weight of 3350 g/mol was obtained and its distribution of low molecular weight oligomers was measured. Analysis of the low molecular weight oligomers shows that this material has a total concentration of 69 ppm of all oligomers with a molecular weight of less than or equal to 240 g/mol, 204 ppm of all oligomers with a molecular weight of less than or equal to 460 g/mol, 617 ppm of all oligomers with a molecular weight of less than or equal to 812 g/mol; and 2014 ppm of all oligomers with a molecular weight of less than or equal to 1472 g/mol. For comparison these values are recorded in Table 3.

Comparative Example F

Another commercially available polyethylene glycol having a reported molecular weight of 3350 g/mol was obtained and its distribution of low molecular weight oligomers was measured. Analysis of the low molecular weight oligomers shows that this material has a total concentration of 81 ppm of all oligomers with a molecular weight of less than or equal to 240 g/mol, 300 ppm of all oligomers with a molecular weight of less than or equal to 460 g/mol, 1076 ppm of all oligomers with a molecular weight of less than or equal to 812 g/mol; and 4590 ppm of all oligomers with a molecular weight of less than or equal to 1472 g/mol. For comparison these values are recorded in Table 3.

Comparative Example G

A commercially available polyethylene glycol having a reported molecular weight of 8000 g/mol is analyzed. The analysis of the low molecular weight oligomers shows that this material has a total concentration of 70 ppm of all oligomers with a molecular weight of less than or equal to 240 g/mol, 218 ppm of all oligomers with a molecular weight of less than or equal to 460 g/mol, 738 ppm of all oligomers with a molecular weight of less than or equal to 812 g/mol; and 3719 ppm of all oligomers with a molecular weight of less than or equal to 1472 g/mol. For comparison these values are recorded in Table 3.

nized that the amount of water and thus the levels of low molecular weight oligomers is affected by the amount of water in the reactants, particularly the initiator and the alkylene oxide. Thus, as reactants having reduced water content become available the present disclosure may be used to provide compositions with even lower concentrations of low molecular weight oligomers. At least some embodiments of the methods described herein have the feature that are capable of producing polymers having the recited low levels of low molecular weight oligomers without the need for extra process steps, such as but not limited to filtration techniques, designed to remove such low molecular weight oligomers. Likewise, the compositions described herein generally do not require purification steps to reduce the concentration of low molecular weight oligomers to the disclosed levels. Such methods and compositions are envisioned by embodiments of the invention.

While the processes are described as comprising one or more steps, these steps may be combined or separated as may

TABLE 3

| Example | Total Oligomer Concentration of oligomers less than or equal to 240 MW | Total Oligomer Concentration of oligomers less than or equal to 460 MW | Total Oligomer Concentration of oligomers less than or equal to 812 MW | Total Oligomer Concentration of oligomers less than or equal to 1472 MW |
|---|---|---|---|---|
| Example 1 | 25 PPM | 75 PPM | 246 PPM | 1009 PPM |
| Example 2 | 18 PPM | 64 PPM | 193 PPM | 450 PPM |
| Comparative Example A | 59 PPM | 248 PPM | 948 PPM | 3965 PPM |
| Comparative Example B | 72 PPM | 208 PPM | 644 PPM | 2314 PPM |
| Comparative Example C | 28 PPM | 151 PPM | 668 PPM | 2994 PPM |
| Comparative Example D | 74 PPM | 235 PPM | 679 PPM | 2693 PPM |
| Comparative Example E | 69 PPM | 204 PPM | 617 PPM | 2014 PPM |
| Comparative Example F | 81 PPM | 300 PPM | 1076 PPM | 4590 PPM |
| Comparative Example G | 70 PPM | 218 PPM | 738 PPM | 3719 PPM |

While the invention has been described with a limited number of embodiments, these specific embodiments are not intended to limit the scope of the invention as otherwise described and claimed herein. Moreover, variations and modifications there from exist. For example, various additives, not enumerated herein, may also be used to further enhance one or more properties of the polyethylene glycol compositions described herein. For example, it may be desirable to add salts or other electrolytes to some compositions. Thus, blending of the compositions described herein with salts, flavors, antioxidants, or one or more other additives is envisioned. In other embodiments, the compositions do not include, or are essentially free of, any components not enumerated herein. As used herein the term "essentially free of" means that such components are not present in more than trace amounts, such as about 5 or 10 ppm, or are not purposely added to the composition. The removal of salts to a desirable level by filtration or other means can also be used in conjunction with some embodiments of the processes described herein to provide compositions having reduced salt content. Also, compositions that consist of or consist essentially of the described components should be considered as disclosed herein. From the disclosure provided herein, it will be recogbe convenient or otherwise desirable. Any step not specifically recited is not included. Finally, any number disclosed herein should be construed to mean approximate, regardless of whether the word "about" or "approximate" is used in describing the number. Last but not the least, the claimed compositions are not limited to the processes described herein. They can be prepared with any suitable process. The appended claims intend to cover all such variations and modifications as falling within the scope of the invention.

What is claimed is:

1. A method of making a polyalkylene glycol composition having reduced low molecular weight oligomers, comprising:
   a) providing a catalyst and an initiator;
   b) providing an alkylene oxide; and
   c) reacting the catalyst, initiator and alkylene oxide to provide a polyalkylene composition having a number average molecular weight range from about 3000 to about 10,000
   wherein the temperature and the concentration of water in the reaction are maintained at a level which is sufficiently low that the total concentration of all oligomers having a molecular weight of less than or equal to 812 g/mol in the resulting composition is less than 400 ppm.

2. The method of claim 1 wherein the concentration of water in the reactor at one or more time, $t_i$, follows the inequality:

$$Wt\%H_2O \leq a_1 - a_2(M_w^{fin}) - a_3\left(\frac{1}{M_w^{int}}\right) -$$

$$a_4(M_w^{fin} - a_5)\left(\left(\frac{1}{M_w^{int}}\right) - a_6\right) + a_7(M_w^{fin})^2\left(\frac{1}{M_w^{int}}\right) - a_8\left(\frac{1}{M_w^{int}}\right)^2 +$$

$$a_9(M_w^{fin})\left(\frac{1}{M_w^{int}}\right)^2 - a_{10}\left(\frac{1}{M_w^{int}}\right)^3 - a_{11}(M_w^{fin} - a_{12})\left(\left(\frac{1}{M_w^{int}}\right)^3 - a_{13}\right);$$

wherein $M_w^{int}$ is the molecular weight of the composition at time $t_i$ and $M_w^{int}$ is less than or equal to 2000 g/mol;

$M_w^{fin}$ represents the final desired molecular weight of the composition;

$a_1$ has a value of 1.92, $a_2$ has a value of $3.8 \times 10^{-4}$, $a_3$ has a value of 260, $a_4$ has a value of 0.0427, $a_5$ has a value of 5590, $a_6$ has a value of $1.54 \times 10^{-3}$, $a_7$ has a value of $2.8 \times 10^{-5}$, $a_8$ has a value of $2.25 \times 10^5$, $a_9$ has a value of 98.8, $a_{10}$ has a value of $1.86 \times 10^7$, $a_{11}$ has a value of 5380, $a_{12}$ has a value of 5590, and $a_{13}$ has a value of $4.78 \times 10^{-8}$.

3. The method of claim 1 wherein the concentration of water in the reactor at one or more time, ti, follows the inequality:

$$Wt\%H_2O \leq a_1 - a_2(M_w^{fin}) - a_3\left(\frac{1}{M_w^{int}}\right) -$$

$$a_4(M_w^{fin} - a_5)\left(\left(\frac{1}{M_w^{int}}\right) - a_6\right) + a_7(M_w^{fin})^2\left(\frac{1}{M_w^{int}}\right) - a_8\left(\frac{1}{M_w^{int}}\right)^2 +$$

$$a_9(M_w^{fin})\left(\frac{1}{M_w^{int}}\right)^2 - a_{10}\left(\frac{1}{M_w^{int}}\right)^3 - a_{11}(M_w^{fin} - a_{12})\left(\left(\frac{1}{M_w^{int}}\right)^3 - a_{13}\right);$$

wherein $M_w^{int}$ is the molecular weight of the composition at time $t_i$ and $M_w^{int}$ is greater than 2000 g/mol;

$M_w^{fin}$ represents the final desired molecular weight of the composition;

$a_1$ has a value of 0.404, $a_2$ has a value of $5.9 \times 10^{-5}$, $a_3$ has a value of 1070, $a_4$ has a value of 0.19, $a_5$ has a value of 6040, $a_6$ has a value of $2.6 \times 10^{-4}$, $a_7$ has a value of $1.49 \times 10^{-5}$, $a_8$ has a value of $6.20 \times 10^5$, $a_9$ has a value of 353, and each $a_{10}$-$a_{13}$ has a value of 0.

4. The method of claim 2 or 3, wherein the polyalkylene glycol is polyethylene glycol which comprises a second total concentration of less than about 50 ppm of all oligomers having a molecular weight of less than or equal to 240 g/mol.

5. The method of claim 4 wherein the polyethylene glycol composition comprises a third total concentration of less than about 1500 ppm of all oligomers having a molecular weight of less than or equal to 1472 g/mol.

6. The method of claim 4 wherein the first total oligomer concentration of all oligomers having a molecular weight of less than or equal to 812 g/mol is less than about 275 ppm.

7. The method of claim 1 wherein the temperature is maintained at less than about 165° C.

8. The method of claim 7 wherein the temperature ranges from about 120° C. to about 160° C.

9. The method of claim 8 wherein the temperature ranges from about 130° C. to about 155° C.

10. The method of claim 9 wherein the temperature ranges from about 135° C. to about 150° C.

11. The method of claim 10 wherein the initiator is a diol and the catalyst comprises a alkali or alkaline earth hydroxide and uses high purity ethylene oxide with less than about 100 ppm water.

12. The method of claim 4 wherein the catalyst is selected from the group consisting of potassium hydroxide, sodium hydroxide, ammonium hydroxide, metal oxide catalysts, alkali and alkaline earth hydroxides, antimony hexafluoride, antimony hexachloride, Na, K, and alkali and alkaline earth methoxides.

13. The method of claim 12 wherein the catalyst is an alkali or alkaline earth hydroxide.

14. The method of claim 4 wherein the initiator is chosen from water, ethylene glycol, diethylene glycol, or any poly (oxyethylene) compound or other diol.

15. The method of claim 14 wherein the initiator is diethylene glycol.

16. The method of claim 4 wherein the alkoxide is ethylene oxide having less than about 100 ppm water.

17. The method of claim 1 wherein the polyalkylene glycol is a polyethylene glycol and the concentration of water in the reactor is less than or equal to 1.5 wt. percent at a time when the molecular weight, Mw, of the polyethylene glycol in the reactor is 1000 g/mol or less.

18. The method of claim 4 wherein the process includes first forming a lower molecular weight polyethylene glycol composition, and thereafter forming the polyethylene glycol composition from at least a portion of the first lower molecular weight polyethylene glycol composition.

19. The method of claim 18 wherein forming the polyethylene glycol composition is accomplished in the absence of catalyst other than that provided to form the first lower molecular weight polyethylene glycol composition.

20. A polyalkylene glycol composition having a number average molecular weight range from about 4000 to about 10,000 g/mol, comprising a first total oligomer concentration of less than about 400 ppm of all oligomers having a molecular weight of less than or equal to 812 g/mol and a second total oligomer concentration of less than about 50 ppm of all oligomers having a molecular weight of less than or equal to 240 g/mol.

21. The composition of claim 20 wherein the polyalkylene glycol composition is a polyethylene glycol composition.

22. The composition of claim 21 having a third total oligomer concentration of less than about 1500 ppm of all oligomers having a molecular weight of less than or equal to 1472 g/mol.

23. The composition of claim 21 wherein the number average molecular weight range is from about 4000 to about 5000 g/mol.

24. The composition of claim 21 wherein the number average molecular weight range is from about 5000 to about 7000 g/mol.

25. composition of claim 21 wherein the number average molecular weight range is from about 7000 to about 9000 g/mol.

26. The composition of claim 21 wherein the first total oligomer concentration is less than about 275 ppm of all oligomers having a molecular weight of less than or equal to 812 g/mol.

27. The composition of claim 26 having a third total oligomer concentration of less than about 1500 ppm of all oligomers having a molecular weight of less than or equal to 1472 g/mol.

28. The composition of claim 26 wherein the number average molecular weight range is from about 4000 to about 7000 g/mol.

29. The composition of claim 26 wherein the number average molecular weight range is from about 7000 to about 9000 g/mol.

30. The composition of claim 26 wherein the composition has a solid product form and with a bulk density of greater than about 0.50 g/cm$^3$.

31. The composition of claim 26 wherein the composition has a solid product form and has an average particle size of less than about 1 mm.

32. A solid polyethylene glycol composition having a bulk density of greater than about 0.50 g/cm$^3$ and less than 0 95 g/cm$^3$ and a number average molecular weight range from about 3000 to about 10,000 g/mol, comprising a first total oligomer concentration of less than about 400 ppm of all oligomers having a molecular weight of less than or equal to 812 g/mol and comprising a second total oligomer concentration of less than about 50 ppm of all oligomers having a molecular weight of less than or equal to 240 g/mol.

33. The composition of claim 32 where the average particle size is less than 1 mm.

34. The composition of claim 32 having a third total oligomer concentration of less than about 1500 ppm of all oligomers having a molecular weight of less than or equal to 1472 g/mol.

35. The composition of claim 32 wherein the number average molecular weight range is from about 3000 to about 4000 g/mol.

36. The composition of claim 32 wherein the number average molecular weight range is from about 4000 to about 5000 g/mol.

37. The composition of claim 32 wherein the number average molecular weight range is from about 5000 to about 7000 g/mol.

38. The composition of claim 32 wherein the number average molecular weight range is from about 7000 to about 9000 g/mol.

39. The composition of claim 32 wherein the composition is essentially free of antioxidants.

40. A polyethylene glycol composition having a number average molecular weight range from about 3000 to about 10,000 g/mol, comprising a first total oligomer concentration of less than about 400 ppm of all oligomers having a molecular weight of less than or equal to 812 g/mol and a second total oligomer concentration of less than about 50 ppm of all oligomers having a molecular weight of less than or equal to 240 g/mol and comprises greater than 0.1 g of water per 1.0 g of polyethylene glycol.

41. A polyalkylene glycol composition having a number average molecular weight range from about 3000 to about 10,000 g/mol, comprising a first total oligomer concentration of less than about 90 ppm of all oligomers having a molecular weight less than or equal to 460 g/mol wherein the composition is obtained without further processing to remove oligomers having a molecular weight of less than about 460 g/mol.

42. The composition of claim 41 wherein the first total oligomer concentration is less than about 70 ppm of all oligomers having a molecular weight of less than or equal to 460 g/mol.

43. The composition of claim 41 having a second total oligomer concentration of less than about 1500 ppm of all oligomers having a molecular weight of less than or equal to 1472 g/mol.

44. The composition of claim 41 where the polyalkylene glycol composition is a polyethylene glycol composition wherein the number average molecular weight range is from about 3000 to about 4000 g/mol.

45. The composition of claim 41 where the polyalkylene glycol composition is a polyethylene glycol composition wherein the number average molecular weight range is from about 4000 to about 5000 g/mol.

46. he composition of claim 41 where the polyalkylene glycol composition is a polyethylene glycol composition wherein the number average molecular weight range is from about 5000 to about 7000 g/mol.

47. The composition of claim 41 where the polyalkylene glycol composition is a polyethylene glycol composition wherein the number average molecular weight range is from about 7000 to about 9000 g/mol.

48. The composition of claim 41 wherein the composition has a solid product form and has a bulk density of greater than about 0.50 g/cm$^3$ to about 0.95 g/cm$^3$.

49. The composition of claim 41 wherein the composition has a solid product form and has an average particle size of less than about 1 mm.

50. A method of making a polyethylene glycol composition having reduced low molecular weight oligomers, comprising:
  a) providing a catalyst and an initiator;
  b) providing an alkylene oxide; and
  c) reacting the catalyst, initiator and alkylene oxide to provide a polyalkylene composition having a number average molecular weight range from about 3000 to about 10,000
  wherein the temperature and the concentration of water in the reaction are maintained at a level which is sufficiently low that the total concentration of all oligomers having a molecular weight of less than or equal to 812 g/mol in the resulting composition is less than 400 ppm;
  wherein the temperature is maintained at less than about 165° C.; and
  wherein the concentration of water in the reactor is less than or equal to 1.5 wt. percent at a time when the molecular weight, Mw, of the polyethylene glycol in the reactor is 1000 g/mol or less.

* * * * *